(12) United States Patent
Jeong

(10) Patent No.: US 11,161,752 B2
(45) Date of Patent: Nov. 2, 2021

(54) PORTABLE WATER-PURIFYING POUCH

(71) Applicant: AMOGREENTECH CO., LTD., Gyeonggi-do (KR)

(72) Inventor: Ui Young Jeong, Incheon (KR)

(73) Assignee: AMOGREENTECH CO., LTD, Gyeonggi-Do (KR)

( * ) Notice: Subject to any disclaimer, the term of this patent is extended or adjusted under 35 U.S.C. 154(b) by 117 days.

(21) Appl. No.: 15/752,119

(22) PCT Filed: Aug. 16, 2016

(86) PCT No.: PCT/KR2016/008977
§ 371 (c)(1),
(2) Date: Feb. 12, 2018

(87) PCT Pub. No.: WO2017/026870
PCT Pub. Date: Feb. 16, 2017

(65) Prior Publication Data
US 2018/0237315 A1  Aug. 23, 2018

(30) Foreign Application Priority Data
Aug. 13, 2015 (KR) .................. 10-2015-0114561

(51) Int. Cl.
*C02F 1/00* (2006.01)
*B01D 39/20* (2006.01)
(Continued)

(52) U.S. Cl.
CPC .............. *C02F 1/002* (2013.01); *B01D 15/00* (2013.01); *B01D 29/13* (2013.01); *B01D 29/27* (2013.01);
(Continued)

(58) Field of Classification Search
None
See application file for complete search history.

(56) References Cited

U.S. PATENT DOCUMENTS 4,564,452 A * 1/1986 Sharpe .................... C02F 1/002
              210/489
8,222,166 B2 * 7/2012 Chu ....................... B01D 69/12
              442/153
(Continued)

FOREIGN PATENT DOCUMENTS

CN   102872729   1/2013
CN   102947501   2/2013
(Continued)

OTHER PUBLICATIONS

Kriegel, C., Kit, K.M., McClements, D.J. et al. Influence of Surfactant Type and Concentration on Electrospinning of Chitosan-Poly(Ethylene Oxide) Blend Nanofibers. Food Biophysics 4, 213-228 (2009). https://doi.org/10.1007/s11483-009-9119-6 (Year: 2009).*

(Continued)

*Primary Examiner* — Jason M Greene
*Assistant Examiner* — Eric J McCullough
(74) *Attorney, Agent, or Firm* — Norton Rose Fulbright US LLP

(57) ABSTRACT

A portable water-purifying pouch is provided that includes a pouch-shaped body comprising an inlet part, through which water to be treated is introduced, and an outlet part, from which drinking water obtained by filtering the water being treated is discharged and a pouch-shaped filter medium, which is provided inside the body so as to hold and filter the water being treated, which has been introduced into the body, and comprises a fiber web layer having the structure of a three-dimensional network formed of nanofibers. The portable water-purifying pouch allows a large flow rate of drinking water to be obtained in a short time while filtering, with significantly superior efficiency, foreign substances such as bacteria and harmful germs in the water (Continued)

being treated merely by self-weight or by lightly applying pressure with a hand to the water being treated.

17 Claims, 7 Drawing Sheets

(51) Int. Cl.
| | | |
|---|---|---|
| B01D 29/27 | (2006.01) | |
| B01D 15/00 | (2006.01) | |
| B01D 29/13 | (2006.01) | |
| B01D 39/16 | (2006.01) | |
| B65D 75/58 | (2006.01) | |
| D04H 1/728 | (2012.01) | |
| C02F 1/28 | (2006.01) | |

(52) U.S. Cl.
CPC ......... *B01D 39/1623* (2013.01); *B01D 39/20* (2013.01); *B65D 75/5883* (2013.01); *D04H 1/728* (2013.01); *B01D 2239/025* (2013.01); *B01D 2239/0216* (2013.01); *B01D 2239/065* (2013.01); *B01D 2239/1208* (2013.01); *B01D 2239/1233* (2013.01); *B01D 2239/1291* (2013.01); *B65D 2575/586* (2013.01); *C02F 1/283* (2013.01); *C02F 2303/02* (2013.01); *C02F 2303/04* (2013.01); *C02F 2305/08* (2013.01); *C02F 2307/02* (2013.01); *Y02A 20/208* (2018.01)

(56) References Cited

U.S. PATENT DOCUMENTS

| | | | |
|---|---|---|---|
| 9,750,829 B2 | 9/2017 | Kozlov et al. | |
| 2007/0075015 A1* | 4/2007 | Bates, III | B01D 39/1623 210/505 |
| 2008/0023394 A1 | 1/2008 | Naruse et al. | |
| 2012/0117985 A1 | 5/2012 | Urbahn et al. | |
| 2013/0315817 A1* | 11/2013 | Yamanoi | B01J 20/20 423/580.1 |
| 2015/0283032 A1 | 10/2015 | Lin et al. | |
| 2018/0304008 A1 | 10/2018 | Seo et al. | |

FOREIGN PATENT DOCUMENTS

| | | | | |
|---|---|---|---|---|
| CN | 102958579 | | 3/2013 | |
| CN | 104785015 | | 7/2015 | |
| CN | 202605880 | | 12/2019 | |
| JP | 2003311263 | | 11/2003 | |
| JP | 2013/022570 | | 2/2013 | |
| KR | 200233744 | | 10/2001 | |
| KR | 20140103866 | | 8/2008 | |
| KR | 100864063 | | 10/2008 | |
| KR | 100871440 | | 12/2008 | |
| KR | 100871440 B1 * | 12/2008 | |
| KR | 100887167 | | 3/2009 | |
| KR | 1020090128108 | | 12/2009 | |
| KR | 101452251 | | 3/2010 | |
| KR | 20110046907 | | 5/2011 | |
| KR | 20110046907 A * | 5/2011 | ........... B01D 39/163 |
| KR | 1020120002491 | | 1/2012 | |
| KR | 20130057973 | | 6/2013 | |
| KR | 20140025579 | | 3/2014 | |
| KR | 20140038157 | | 3/2014 | |
| KR | 20140137197 | | 12/2014 | |
| KR | 20140142018 | | 12/2014 | |
| KR | 101675865 | | 11/2016 | |
| WO | WO 2010/011984 | | 1/2010 | |
| WO | WO 2011/052865 | | 5/2011 | |
| WO | WO-2014039509 A2 * | 3/2014 | ............. C03C 25/44 |

OTHER PUBLICATIONS

Zobel, S., et al. "Simulating Permeability of 3-D Calendered Fibrous Structures." Chemical Engineering Science, vol. 62, No. 22, 2007, pp. 6285-6296., doi:10.1016/j.ces.2007.07.007 (Year: 2007).*
International Search Report and Written Opinion Issued in Corresponding International Patent Application No. PCT/KR/2016/008977, dated Jan. 6, 2017.
International Search Report and Written Opinion Issued in PCT Application No. PCT/KR2016/011574, dated Jan. 13, 2017.
Office Action issued in Corresponding Korean Patent Application No. 10-2016-0133749, dated Jun. 17, 2019 (English Translation).
Widmark, Jill M., "Imaging-related medications: a class review" *Baylor University Medical Center Proceedings 2007*, 20(4), 408-417.
Office Action Issued in Corresponding Chinese Patent Application No. 201680047861.2, dated Aug. 28, 2019. (English Translation Provided).

* cited by examiner

PORTABLE WATER-PURIFYING POUCH

CROSS-REFERENCE TO RELATED APPLICATIONS

This application is a national phase application under 35 U.S.C. § 371 of International Application No. PCT/KR2016/008977, filed Aug. 16, 2016, which claims priority to Korean Application No. 10-2015-0114561, filed Aug. 13, 2015. The contents of the referenced applications are incorporated into the present application by reference.

FIELD OF THE DISCLOSURE

The present invention relates to a portable water-purifying pouch, and more particularly, to a portable water-purifying pouch through which a large amount of drinking water may be obtained in a short time because filter efficiency for filtering foreign materials, such as bacteria, harmful germs, etc., in target water is superior and water permeability is also superior even using only a weight thereof without an additional pressing unit for filtering target water, and which has superior portability due to a pouch shape.

DESCRIPTION OF RELATED ART

Water purifiers refer to devices for filtering various foreign materials contained in water and purify the water, and recently, interest in water-purifying technology has been increasing in order to obtain good quality water because of a worldwide shortage of drinking water due to a population increase and an environmental pollution problem. Particularly, in third world countries in Africa and Southeast Asia, many people suffer from an extreme shortage of drinking water, and dirty sewage in surrounding rivers and reservoirs is used as drinking water or living water without a water-purifying process being performed thereon. In addition, as interest in health has increased in developed countries, water purifiers have become a necessity not only in ordinary households but also in restaurants.

Meanwhile, portable water bottles are portable containers capable of storing a predetermined amount of water. The portable water bottles are widely used because water can be easily kept without a location restriction. As industrialization has progressed, environmental pollution has become more serious and water pollution has become a social problem. Accordingly, interest in a water bottle for storing and drinking clean water has grown.

In addition, as the number of people enjoying outdoor recreational activities, such as fishing and hiking, has recently increased, demand for drinking purified-water in outdoors has remarkably increased more than the demand for a simple function as a water bottle for storing clean water.

Further, it is important to obtain good quality drinking water during military field training or outback exploration, however, there is a limitation on an amount of purified water to be carried in advance because of a volume or weight burden of the purified water, and there is a limitation on the use water that can be obtained outdoors as drinking water as it is because the water cannot be used as drinking water due to severe environmental pollution and breeding of various harmful germs such as bacteria.

Various portable water purifiers have been recently developed to meet such a demand, however, since the portable purifier includes a pressing unit that requires an additional energy source to filter target water, there are problems in that portability is remarkably degraded and cost during water purifying incurs.

Therefore, there is an urgent need to develop a portable water-purifier capable of easily purifying a large amount of drinking water in a short time using available water obtained outdoors without a pressing unit that requires additional energy and having excellent portability.

SUMMARY OF THE INVENTION

The present invention is directed to providing a portable water-purifying pouch through which a large amount of drinking water may be obtained in a short time because filter efficiency for filtering foreign materials, such as bacteria, harmful germs, etc., in the target water is superior and water permeability is also superior even using only a weight thereof without an additional pressing unit for filtering target water, and which has superior portability due to a pouch shape.

One aspect of the present invention provides a portable water-purifying pouch including: a body having a pouch shape and including an inlet through which target water is introduced and an outlet through which drinking water generated by the target water being filtered is discharged; and a filter medium having a pouch shape, provided in the body to accommodate and filter the target water introduced into the body, and including a fiber web layer having a three-dimensional network structure formed of nanofibers.

According to one embodiment of the present invention, an outer surface of at least one open end portion among outer surfaces of the pouch-shaped filter medium may be fixed to an inner surface of the body.

Further, the pouch-shaped filter medium may further include a support layer in which at least a part of the support layer is melted and thermally fused to one or both surfaces of the fiber web layer including the nanofibers.

Further, the pouch-shaped filter medium may further include the support layer, the fiber web layer may be disposed on each of both surfaces of the fiber web layer, and at least a part of the support layer may be melted and thermally fused to the fiber web layer.

Further, the support layer may include at least one among a nonwoven structure, a knit structure, and a fabric.

Further, at least one among the nonwoven structure, the knit structure, and the fabric may include a polyolefin-based low-melting point conjugated fiber or a polyester-based low-melting point conjugated fiber.

Further, a fused portion formed by at least a part of the support layer being melted and permeated through pores included in one region of the fiber web layer may be included in the one region of the fiber web layer in contact with the support layer, and an average height of the fused portion in a thickness direction of the fiber web layer may be one fiftieth or more of a thickness of the fiber web layer.

Further, the average height of the fused portion may range from one fiftieth to one twenty-fifth in the thickness direction of the web layer.

Further, a cross-sectional thickness of the filter medium may range from 10 μm to 300 μm.

Further, the fiber web layer may have a thickness of 5 μm to 20 μm and a basis weight of 1 g/m$^2$ to 10 g/m$^2$.

Further, the fiber web layer may have a porosity of 70 to 90% and an average pore diameter of 0.2 μm to 0.5 μm.

Further, a diameter of the nanofiber may range from 0.3 μm to 0.7 μm.

Further, the nanofiber may include a fiber-forming material having polyacrylonitrile (PAN) and polyvinylidene fluoride (PVDF), and a nonionic emulsifier which improves miscibility and spinnability of the fiber-forming material.

Further, the portable water-purifying pouch may include a porous carbon filler which deodorizes drinking water filtered by the filter medium and adsorb a foreign material, and an encapsulating material which encapsulates the porous carbon filler.

Further, the portable water-purifying pouch may further include an internal carbon-based filter provided in at least one location inside the body and the outlet, or an external carbon-based filter connected to the outlet through a connecting member and provided outside the body.

Further, the carbon-based filter provided outside the body further may include an outlet through which refiltered drinking water is discharged.

Further, the portable water-purifying pouch may further include a drinking pipe connected to one side of the outlet such that drinking water filtered by the filter medium is drunk.

Further, the portable water-purifying pouch may further include a carbon-based filter having a porous carbon filler which is interposed between one end and the other end of the drinking pipe and deodorizes drinking water suctioned through the drinking pipe and adsorb a foreign material, and an encapsulating material which encapsulates the porous carbon filler.

Further, the inlet may be formed by at least a part of one side of the body being opened.

Another aspect of the present invention provides a portable water-purifying pouch including: a body having a pouch shape and including a first region having at least an open part of one side such that target water is introduced therethrough and configured to accommodate the target water, and a second region in which drinking water generated by the target water being filtered is accommodated and which has an outlet through which the drinking water generated by the target water being filtered is discharged, and a filter medium having a pouch shape, configured to divide the first region and the second region provided in the body, and including a fiber web layer having a three-dimensional network structure formed of nanofibers.

Still another aspect of the present invention provides a portable water-purifying package including: the portable water-purifying pouch; a drinking pipe; and a beverage storage container including a container in which the portable water-purifying pouch and the drinking pipe are provided and a cap.

According to one embodiment of the present invention, the drinking pipe may further include a carbon-based filter between one end and the other end of the drinking pipe.

Further, the portable water-purifying package may further include a carbon-based filter having one end coupled to the portable water-purifying pouch and the other end coupled to the drinking pipe.

According to the present invention, foreign materials, such as bacteria, harmful germs, etc., in target water can be filtered with remarkable efficiency even using only a weight thereof or a slight manual pressing of target water without an additional pressing unit for filtering target water, and a large amount of drinking water can also be obtained in a short time. In addition, a water-purifying pouch including a filter medium made of nanofibers according to one embodiment of the present invention can obtain a larger amount of drinking water due to its high mechanical strength, superior chemical resistance, and high hydrophilicity. In addition, since the portable water-purifying pouch has a pouch shape, a thickness thereof is remarkably thin, a weight thereof is light, and thus portability thereof is superior.

BRIEF DESCRIPTION OF THE DRAWINGS

FIG. 2A is a view illustrating a case in which a fiber web layer is formed on one surface of a support layer and disposed in the pouch, FIG. 2B is a view illustrating a case in which support layers are formed on both surfaces of a fiber web layer, and FIG. 2C is a view illustrating a case in which fiber web layers are formed on both surfaces of a support layer.

FIG. 5A is a view illustrating the carbon-based filter disposed in a body such that the carbon-based filter is in direct contact with an outer portion of the filter medium, FIG. 5B is a view illustrating the carbon-based filter disposed below the filter medium in the body, and FIG. 5C is a view illustrating the carbon-based filter disposed in an outlet provided in the body.

DETAILED DESCRIPTION OF THE INVENTION

Figure 1:
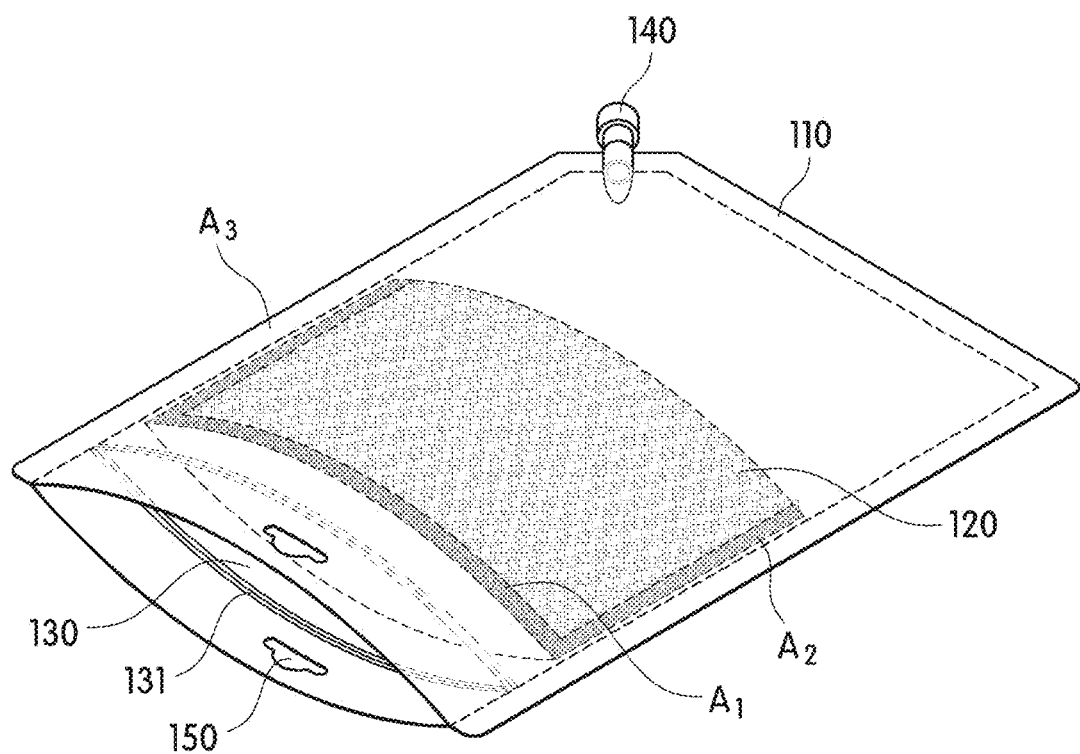
FIG. 1 is a perspective view illustrating a portable water-purifying pouch according to one embodiment of the present invention.

Hereinafter, embodiments that are easily performed by those skilled in the art will be described in detail with reference to the accompanying drawings. However, the embodiments of the present invention may be implemented in several different forms and are not limited to embodiments described herein. Parts irrelevant to the description will be omitted in the drawings in order to clearly explain the embodiments of the present invention, and similar parts will be denoted by similar reference numerals throughout this specification.

Figure 9:
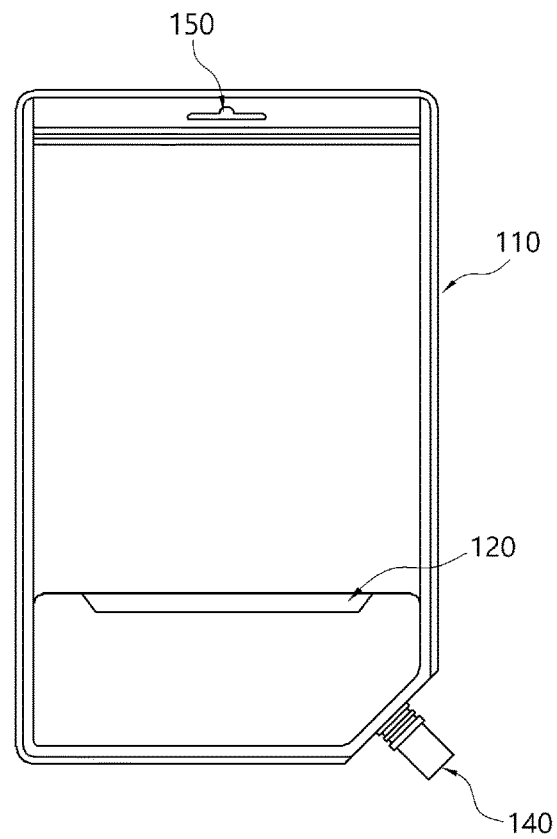
FIG. 9 is an image of the carbon-based filter according to one embodiment of the present invention.

As illustrated in FIGS. 1 and 9, a portable water-purifying pouch 100 according to one embodiment of the present invention includes a pouch-shaped body 110 and a filter medium 120 inside the body 110. The pouch-shaped body 110 includes an inlet 130 into which target water is introduced through one fully open side, and an outlet 140 through which drinking water generated by the target water being filtered is discharged. In addition, the filter medium 120 may have a pouch shape in which all other sides other than one side are bonded such that target water and introduced through the inlet 130 is accommodated therein, and the filter medium 120 may be disposed in the body 110 such that water flows from the inlet 130 of the body to the one open side of the filter medium 120.

First, the pouch-shaped body 110 will be described.

The pouch-shaped body 100 may include any kind of known material used in a water storage container, and the pouch-shaped body 100 may preferably include any kind of material which is light and easily foldable in consideration of portability and in which harmful materials, such as environmental hormones, are not discharged into drinking water. As a non-restrictive example, the body may be molded using one or more materials selected from the group consisting of polyethylene terephthalate (PET), polyethylene (PE), and nylon.

A thickness of one cross section of the body 110 according to one embodiment of the present invention may range from 100 to 500 μm, and an internal volume thereof may range from 500 to 5,000 cm$^3$, but the thickness and internal volume are not limited thereto, and the body 110 may be manufactured to be smaller or larger according to purpose. In addition, the body may have any kind of shape which may be manufactured as a pouch. The body 110 may be manufactured through a method in which the body is extruded to have a target pouch shape or a sheet shape, and open edges thereof other than one side at which the inlet 130 is located are sealed through heat, pressure, and/or an adhesive, but the body is not limited thereto.

In addition, the body 110 according to one embodiment of the present invention includes the inlet 130 through which target water is introduced. Since the inlet 130 may include any kind of configuration of an inlet provided in a known portable water purifier, the inlet 130 according to the present invention is not particularly limited. Preferably, the body 110 may be formed to have at least an open part at one side thereof to improve portability through foldability and weight reduction of the body, and more preferably, the body 110 may be formed to have one fully open side (see FIG. 1).

In addition, as illustrated in FIG. 1, the inlet having at least the open part at the one side of the body 110 may include a coupling member 131 such as an engaging type plastic member for isolating an inside of the body from an outside thereof to prevent leakage of target water to the outside of the body and prevent introduction of foreign materials into the inside thereof during a filtering process after the target water is introduced into the body.

In addition, the body 110 according to one embodiment of the present invention includes the outlet 140 through which drinking water generated by target water being filtered is discharged. Since the outlet 140 may include any kind of configuration of an outlet provided in a general portable water purifier, a portable water bottle, or the like, the outlet 140 according to the present invention is not particularly limited. However, the outlet 140 may preferably include an opening and closing member at one end portion thereof for discharging drinking water stored in the body and may be formed to lengthily protrude such that a person can easily drink the drinking water with his or her mouth without a container such as a cup, as illustrated in FIG. 1.

In addition, the body 110 according to one embodiment of the present invention may include a hooking member (not shown) or a hanging opening 150 illustrated in FIG. 1 or 9 such that target water accommodated in the filter medium 120, which will be described below, is easily affected by a weight thereof, and the body 110 is fixed to a carry-on bag while being moved during a filtering process or easily fixed to a fixed object such as a tree or a wall of a building.

Next, the filter medium 120 provided in the above-described body 110 will be described.

Figure 2A:
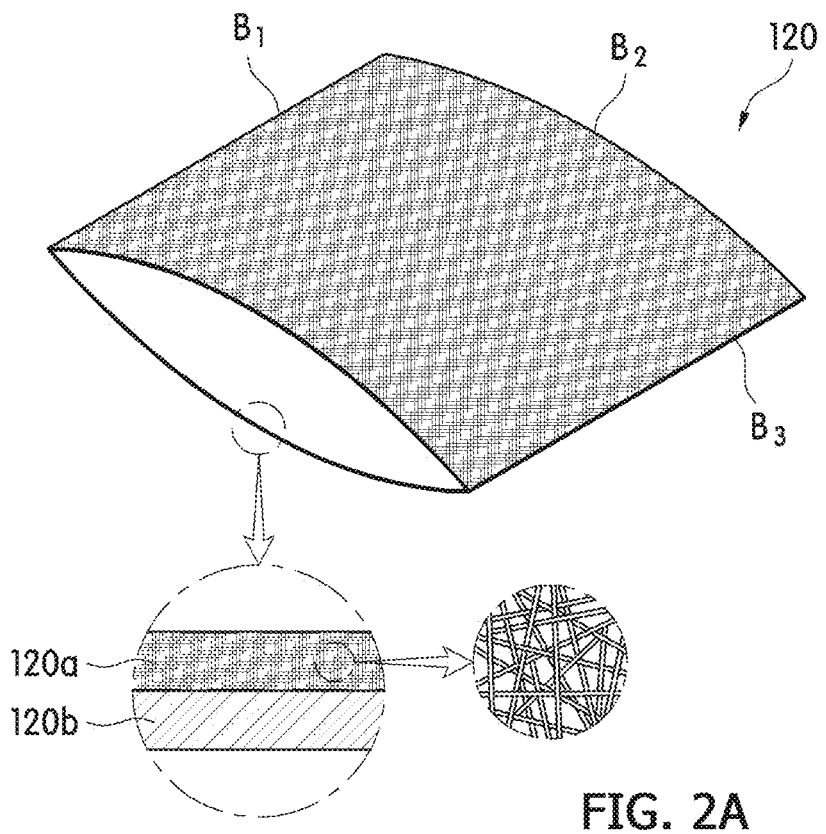
FIGS. 2A to 2C are perspective views and cross-sectional views illustrating a pouch-shaped filter medium according to one embodiment of the present invention.

As illustrated in FIG. 2A, the filter medium 120 has a pouch shape having one open end, but the specific shape thereof is not limited, and the filter medium 120 may preferably have the same pouch shape as the body 110. For example, in a case in which the body has a structure in which both surfaces of the body are bent toward an inside of the body to increase an accommodation space inside the body, the filter medium may also have a structure in which both unopened and opposing surfaces thereof are bent toward an inside thereof similarly to the shape of the body, and since an effective filtering area is increased due to the structure, there is an advantage in that a larger flow rate may be secured.

Referring to FIG. 1, an outer surface A1 of at least one open end portion among outer surfaces of the pouch-shaped filter medium 120 may be fixed to an inner surface of the body, or the outer surface A1 of the one open end portion and outer surfaces A2 and A3 at both sides thereof may be fixed to the inner surface of the body. A method of fixing the filter medium 120 to the body 110 may be to fuse an outer surface of the filter medium 120 to the inner surface of the body 110 using an insoluble adhesive, heat, and/or a pressure, but the method is not limited thereto.

Figure 2B:
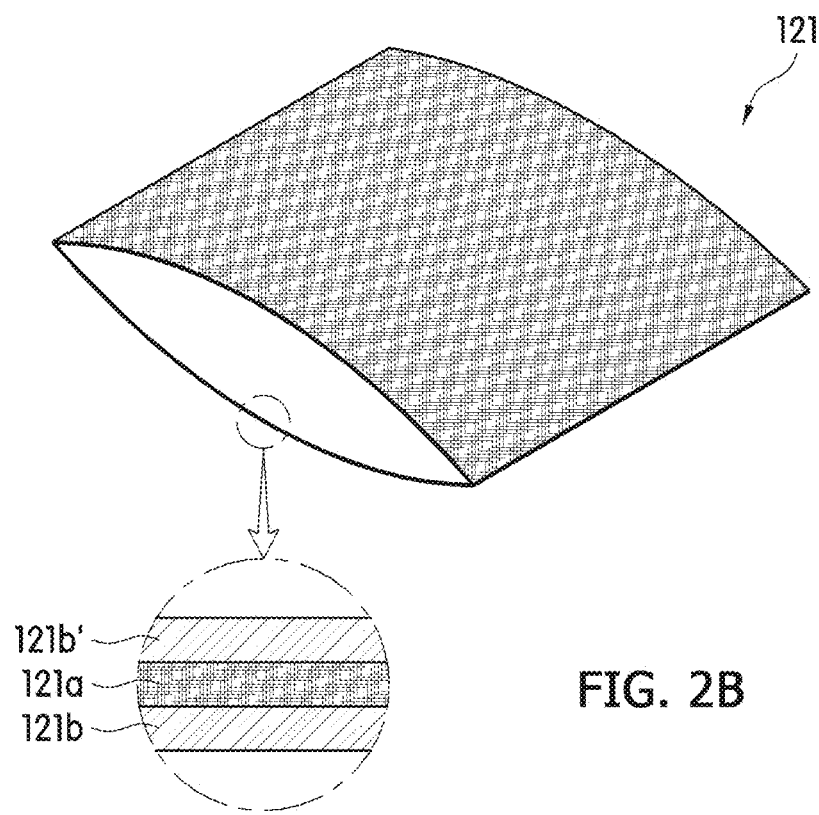
Figure 2C:
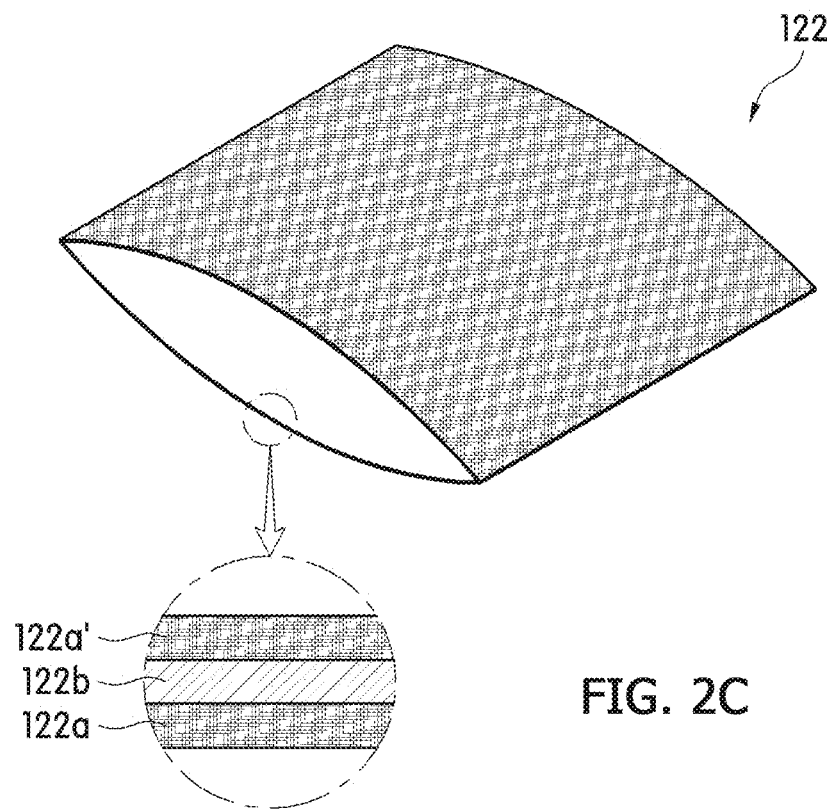

The pouch-shaped filter medium 120 may include a fiber web layer 120a having a three-dimensional network structure formed of nanofibers and may further include a support layer 120b formed on the fiber web layer, as illustrated in FIG. 2A, or the pouch-shaped filter medium 120 may include a fiber web layer 121a having a three-dimensional network structure formed of nanofibers and may further include support layers 121b and 121b' formed on both surfaces of the fiber web layer, as illustrated in FIG. 2B. Alternatively, the filter medium 120 may further include a support layer 122b and have a structure in which fiber web layers 122a and 122a' are disposed on both surfaces of the support layer 122b, as illustrated in FIG. 2C. In addition, in the case in which the support layer is provided as a single layer on one surface of the fiber web layer, as illustrated in FIG. 2A, the fiber web layer 120a may be in direct contact with target water and the support layer 120b may be provided in the body to be in contact with drinking water, and since the fiber web layer is exposed to a region in which the target water is stored, cleaning is easy, and thus there is an advantage in that a user may clean and reuse the portable water-purifying pouch.

Figure 3:
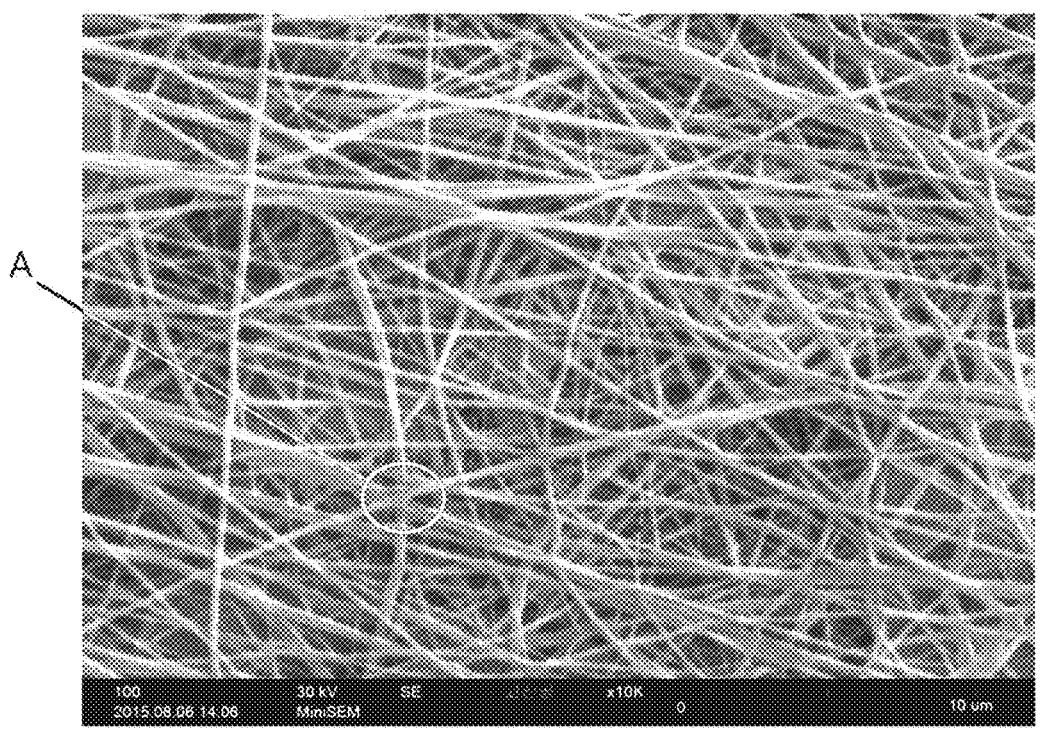
FIG. 3 is a scanning electron microscope (SEM) image of the fiber web layer included in the pouch-shaped filter medium according to one embodiment of the present invention.

The fiber web layers 120a, 121a, 122a, and 122a' have a three-dimensional network structure formed of nanofibers, as illustrated in FIGS. 2A and 3. Referring to FIG. 3, the nanofibers may be perpendicularly stacked on a spun surface, the three-dimensional network structure may be formed in a state in which fusion A is generated at regions at which nanofibers among the stacked nanofibers are in contact with a fiber surface due to a remaining solvent contained in a spinning solution which is not evaporated into air during a spinning process, and such a three-dimensional network structure may be further progressed by a first calendaring process of a manufacturing method, which will be described below. In the case in which the fiber web layer having the three-dimensional network structure is formed as the filter medium, a filtering process may be performed by only a weight thereof even without an additional press unit or an energy source in comparison to a different shape or a case in which a different kind of separating membrane such as a hollow thread membrane is formed, water permeability is superior, and thus there is an advantage in that a large flow rate may be obtained.

In addition, each of the fiber web layers 120a, 121a, 122a, and 122a' according to one embodiment of the present invention may have a thickness of 0.5 to 100 µm, a porosity of 40 to 90%, and an average pore diameter of 0.1 to 0.5 µm. When the diameter is greater than 0.5 µm, bacteria or harmful germs cannot be filtered, and when the diameter is less than 0.1 µm, it may be difficult to obtain a target flow rate with only the weight thereof. In addition, a basis weight of the fiber web layers 120a, 121a, 122a, and 122a' may range from 0.5 to 50 g/m², but is not limited thereto, and may be suitably changed in consideration of a target water permeability rate and a target filter efficiency. In addition, a diameter of the nanofiber forming the fiber web layer may range from 0.05 to 2 µm, and an aspect ratio thereof may range from 1,000 to 100,000 but are limited thereto.

In addition, one or more layers of each of the fiber web layers 120a, 121a, 122a, and 122a' may be formed on the filter medium, and here, the porosities, the pore diameters, the basis weights, the thicknesses, and/or the like of the fiber web layers may be different.

In addition, since the nanofiber forming the fiber web layers 120a, 121a, 122a, and 122a' may be formed of a fiber and any fiber-forming material suitable for a method of manufacturing a general nanofiber may be used without limit, the nanofiber of the present invention is not limited thereto. As a non-restrictive example, the fiber-forming material may be selected from the group consisting of polyvinylidene fluoride (PVDF), poly(vinylidene fluoride-co-hexafluoropropylene), perfluoropolymer, polyvinyl chloride, polyvinylidene chloride or copolymers thereof, polyethylene glycol derivatives including polyethylene glycol dialkyl ether and polyethylene glycol dialkyl ester, poly(oxymethylene-oligo-oxyethylene), polyoxides including polyethylene oxide and polypropylene oxide, polyvinyl acetate, poly(vinylpyrrolidone-vinyl acetate), polystyrene and polystyrene acrylonitrile copolymers, polyacrylonitrile (PAN), polyacrylonitrile copolymer including polyacrylonitrile methyl methacrylate copolymer, polymethyl methacrylate, polymethyl methacrylate copolymer, or a mixture thereof.

However, the nanofiber according to one embodiment of the present invention may include PAN and PVDF as the fiber-forming material and may further include a nonionic emulsifier configured to improve miscibility and spinnability of the fiber-forming material. The PVDF may secure mechanical strength and chemical resistance of the nanofiber due to material properties thereof, and since the PAN is highly hydrophilic, the PAN may prevent the nanofibers from having hydrophobicity due to the PVDF and improve hydrophilicity of the nanofiber so that improved water permeability can be exhibited when the nanofibers are provided in a water treatment separating membrane.

Since any known PVDF may be selected, the PVDF is not particularly limited in the present invention. A weight-average molecular weight of the PVDF may range from 10,000 to 1,000,000 and may preferably range from 20,000 to 800,000.

In addition, the PAN may be selected from any known polymer of acrylonitrile and a comonomer, and a mole % in a copolymer, a kind of comonomer, and the like are not particularly limited in the present invention. As a non-restrictive example, the comonomer may include one or more selected from the group consisting of methylacrylate, methylmethacrylate, vinylacetate, itaconic acid, acrylic acid, methacrylic acid, and the like. In addition, as a non-restrictive example, a weight ratio of a content of the acrylonitrile to a content of the comonomer may range from 60:40 to 99.9:0.01. In addition, the PAN may include alkoxycarbonyl or alkanonoxy at a framework and a side chain of the ethylene to exhibit enhanced hydrophilicity and/or flexibility of the nanofiber.

A weight-average molecular weight of the PAN may range from 3,000 to 500,000 and may preferably range from 5,000 to 100,000. When the weight-average molecular weight is less than 3,000, it is difficult for the nanofiber to exhibit a target hydrophilicity, and when the weight-average molecular weight is greater than 500,000, there is a problem in that spinnability thereof may be remarkably reduced.

Regarding the above-described PVDF and PAN, the fiber-forming material may include the PAN at 5 to 20 parts by weight with respect to 100 parts by weight of the PVDN. When the fiber-forming material includes the PAN at less than 5 parts by weight, the nanofiber may not exhibit a target level of hydrophilicity, and thus water permeability of a separating membrane formed of the PAN may be remarkably reduced, and when the fiber-forming material includes the PAN at more than 20 parts by weight, the water permeability of the separating membrane may be improved according to the hydrophilicity being improved, but the mechanical strength and the chemical resistance of the nanofiber may be remarkably reduced, and thus there may be a mass production problem in that the spinnability thereof is reduced.

In addition, the nonionic emulsifier simultaneously serves to improve the miscibility and the spinnability of the fiber-forming material, and further improve the hydrophilicity of the nanofiber. Even when the PVDF and PAN is dissolved in one specific solvent as the above-described fiber-forming material, the two components are not uniformly mixed in a solution because of the different properties thereof, and even when the two components are stirred and mixed, the two components are only temporarily mixed, and thus the two components are easily separated in the solution as time passes. In a case in which such a solution is used as a spinning solution, since an electrically spun nanofiber may be the nanofiber, in which specifically, one of the two components of the electrically spun nanofiber is sparsely disposed on the other component like islands or a structure, in which any one component continues and the other component continues, repeats in a state in which the two components are not mixed, the hydrophilicity, the mechanical strength, and the chemical resistance thereof are not simultaneously exhibited, a portion of the nanofiber at which the PAN is concentrated may be easily cut, and thus there is a problem in that durability of the separating membrane formed of the PAN may also be reduced remarkably. Accordingly, the two components having different properties have to be compounded to be uniformly distributed in the nanofiber to form the fiber. To this end, the nonionic emulsifier is necessary. When, for example, only a cationic emulsifier and an anionic emulsifier having different properties are used without the nonionic emulsifier, spinnability may be remarkably reduced or spinning itself may not be performed.

The nonionic emulsifier may include any known nonionic emulsifier, and as a non-restrictive example, the nonionic emulsifier may include an ethoxylate compound (Ex. alkylphenol polyethylene oxide condensate) synthesized by adding ethylene oxide to a hydrophobic compound such as a linear aliphatic hydrocarbon, an esterified product of a compound having a polyfunctional hydroxyl group, an adduct obtained by adding ethylene oxide to an esterified product, an adduct obtained by adding ethylene oxide to a fatty acid, or the like. Specifically, the nonionic emulsifier may include a combination with one or more among a sugar alcohol fatty acid ester such as a sorbitan fatty acid ester, a polyoxyethylene sorbitan fatty acid ester, a sucrose fatty acid ester, a polyhydric alcohol fatty acid ester such as a glycerin fatty acid ester, a polyglycerin fatty acid ester, a polyoxyethylene glycerin fatty acid ester, and a polyethylene glycol fatty acid ester, an ether type or ester type surfactant such as a polyoxyethylene alkyl ether, a polyoxyethylene polyoxypropylene copolymer, a polyoxyethylene alkyl phenyl ether, and a polyoxyethylene hardened castor oil, a fatty acid alkanolamide such as a lauric acid diethanolamide, and the like.

In addition, a hydrophile-lipophile balance (HLB) of the nonionic emulsifier included in the nanofiber according to one embodiment of the present invention may range from 10 to 18, may preferably range from 12 to 19, may more preferably range from 13 to 17, and may even more preferably range from 14 to 16. When the HLB is less than 10, improvement of hydrophilicity using the nonionic emulsifier may be insignificant compared to a target, the miscibility of the PVDF and PAN may be remarkably reduced, and the nonionic emulsifier may be lumped and located at a side of the PVDF at which the nonionic emulsifier is not compounded. In addition, when the HLB is greater than 18, there may be problems in that the miscibility of the PVDF and PAN may be remarkably reduced and the nonionic emulsifier may be lumped and located at a side of the PAN at which the nonionic emulsifier is not compounded. The HLB of the nonionic emulsifier may be an HLB of a corresponding component in a case in which one nonionic emulsifier is included in the nonionic emulsifier, and in a case in which the nonionic emulsifier includes two or more nonionic emulsifiers which are compounded, the HLB may have a value of an HLB finally calculated in consideration to contents and HLB s of corresponding components.

In addition, the nonionic emulsifier included in the nanofiber according to one embodiment of the present invention may include the nonionic emulsifier at 0.5 to 8 parts by weight with respect to 100 parts by weight of the fiber-forming material. When the nanofiber includes the nonionic emulsifier at less than 0.5 parts by weight, the miscibility of the PVDF and PAN may be remarkably reduced, and the amount of beads may remarkably increase on a surface of the spun nanofiber, when the nanofiber includes the nonionic emulsifier at more than 8 parts by weight, there may be a problem in that it is difficult to form a required pore size due to an increase in the diameter of the nanofiber. Meanwhile, although the nanofiber may additionally include a cationic emulsifier, an anionic emulsifier, and/or an amphoteric emulsifier to improve the miscibility of the PVDF and PAN, it is preferable for contents thereof to be minimized from a spinnability aspect even when the nanofiber includes the cationic emulsifier, the anionic emulsifier, and/or the amphoteric emulsifier.

Next, each of the support layers 120b, 121b, 121b', and 122b is not particularly limited to a specific layer as long as it serves as a support of the separating membrane, but the shape thereof may preferably be that of a fabric, a knit structure, or a nonwoven structure. The fabric includes fiber oriented in longitudinal and transverse directions, and a specific weave thereof may be a plain weave, a twill weave, or the like, and densities of warp and weft yarns are not particularly limited. In addition, the knit structure may have a known knit weave, and may be a weft knit, a warp knit, or the like, but is not particularly limited thereto. In addition, the nonwoven structure may be a known nonwoven structure such as a dried nonwoven structure such as a chemically bonded nonwoven structure, a thermally bonded nonwoven structure, and an air ray nonwoven structure, a wet nonwoven structure, a spunless nonwoven structure, a needle punching nonwoven structure, or a meltblown nonwoven structure, and since a pore diameter, porosity, a basis weight, and the like of the nonwoven structure may be changed according to target water permeability, filter efficiency, and mechanical strength, they are not particularly limited in the present invention.

Materials of the support layers 120b, 121b, 121b', and 122b are not limited. As a non-restrictive example, each of the support layers 120b, 121b, 121b', and 122b may preferably include a synthetic fiber selected from the group consisting of polyester, polypropylene, a nylon, and polyethylene, or a natural fiber including cellulose. However, the material of each of the support layers preferably includes a low-melting point polymer compound such as a known low-melting point polyester and a low-melting point polyethylene capable of being thermally fused, more preferably includes a polyester based low-melting point conjugated fiber having a low-melting point polyester used as an initial portion and polyethylene terephthalate used as a core portion, and/or a polyolefin based low-melting point conjugated fiber having a low-melting point polyethylene used as an initial portion and polypropylene used as a core portion in order to prevent the support layers from being separated from the fiber web layers during a filtering process of water being treated by improving a bonding force between each of the above-described fiber web layers 120a, 121a, 122a, and 122a' and each of the corresponding support layers to prevent degradation of water permeability due to an additional adhesive material being used, and to be thermally bonded to the inner surface of the above-described body 110. A melting point of the low-melting point polymer compound may range from 60° C. to 180° C.

In addition, the thickness of each of the support layers 120b, 121b, 121b', and 122b may range from 10 to 200 µm, but is not limited thereto, and a total thickness of each of the filter medium may range from 10 to 300 µm in consideration of the thickness of each of the above-described fiber web layers 120a, 121a, 122a, and 122a' and each of the support layers 120b, 121b, 121b', and 122b.

Here, a fused portion formed by at least a part of each of the support layers 120b, 121b, 121b', and 122b being melted and permeated through pores included in one region of the fiber web layer may be included in the one region of each of the corresponding fiber web layers 120a, 121a, 122a, and 122a' in contact with each of the support layers 120b, 121b, 121b', and 122b.

For example, as illustrated in FIG. 2A, in a case in which the support layer 120b is disposed on one surface of the fiber web layer 120a, a fused portion may be formed toward the fiber web layer 120a at an interface at which the fiber web layer 120a meets the support layer 120b. Alternatively, as illustrated in FIG. 2B, in a case in which the support layers 121b and 121b' are disposed on both surfaces of the fiber web layer 121a, fused portions may be formed toward the fiber web layer at interfaces at which the support layers 121b and 121b' meet the fiber web layer 121a, and in this case, two fused portions may be formed in one fiber web 121a. Alternatively, as illustrated in FIG. 2C, in a case in which the fiber web layers 122a and 122a' are disposed on both surfaces of the support layer 122b, fused portions may be formed toward the fiber web layers 122a and 122a' in contact with both of the surfaces of the support layer 122b, and thus one fused portion may be formed in each of the fiber web layers 122a and 122a'. In this case, since the support layer 122b and the fiber web layers 122a and 122a' may be attached without using an additional adhesive, there is an advantage in that a problem of drinking water contamination occurring due to dissolution of an adhesive when water is filtered is prevented.

Meanwhile, an average height of the fused portion in a thickness direction of a vertical cross section of the fiber web layer may be one fiftieth or more of the thickness of the fiber web layer. The average height of the fused portion is an average of heights of the fused portion from one interface at which the fiber web layer meets the support layer based on the vertical cross section of the fiber web layer, and in the case in which two fused portions are disposed on the fiber web layer, as illustrated in FIG. 2B, the average height of the fused portion is the average height of any one fused portion formed on the interface at which the fiber web layer 121a meets any one support layer of the two support layers 121b and 121b'. In the case in which the average height of the fused portion is less than one fiftieth of the thickness of the fiber web layer, since a coupling force between the support layer and the fiber web layer decreases, the support layer is separated from the fiber web layer, and thus filter efficiency thereof may be reduced.

In addition, the average height of the fused portion may preferably range from one fiftieth to one twenty-fifth of the thickness of the fiber web layer. Here, when the average height of the fused portion is greater than one twenty-fifth of the thickness of the fiber web layer, the water permeability decreases when water passes through the filter medium.

The above-described fiber web layer and the filter medium including the same may be manufactured through a known method, and thus a method of manufacturing the fiber web layer and the filter medium is not particularly limited in the present invention. However, the filter medium 120 according to one embodiment of the present invention may be manufactured through non-consecutive processes in which nanofibers are separately formed, the fiber web layer is formed of the nanofibers, and the filter medium 120 is formed, or through inline processes from a nanofiber manufacturing process to a manufacturing process of the filter medium 120.

Figure 4:
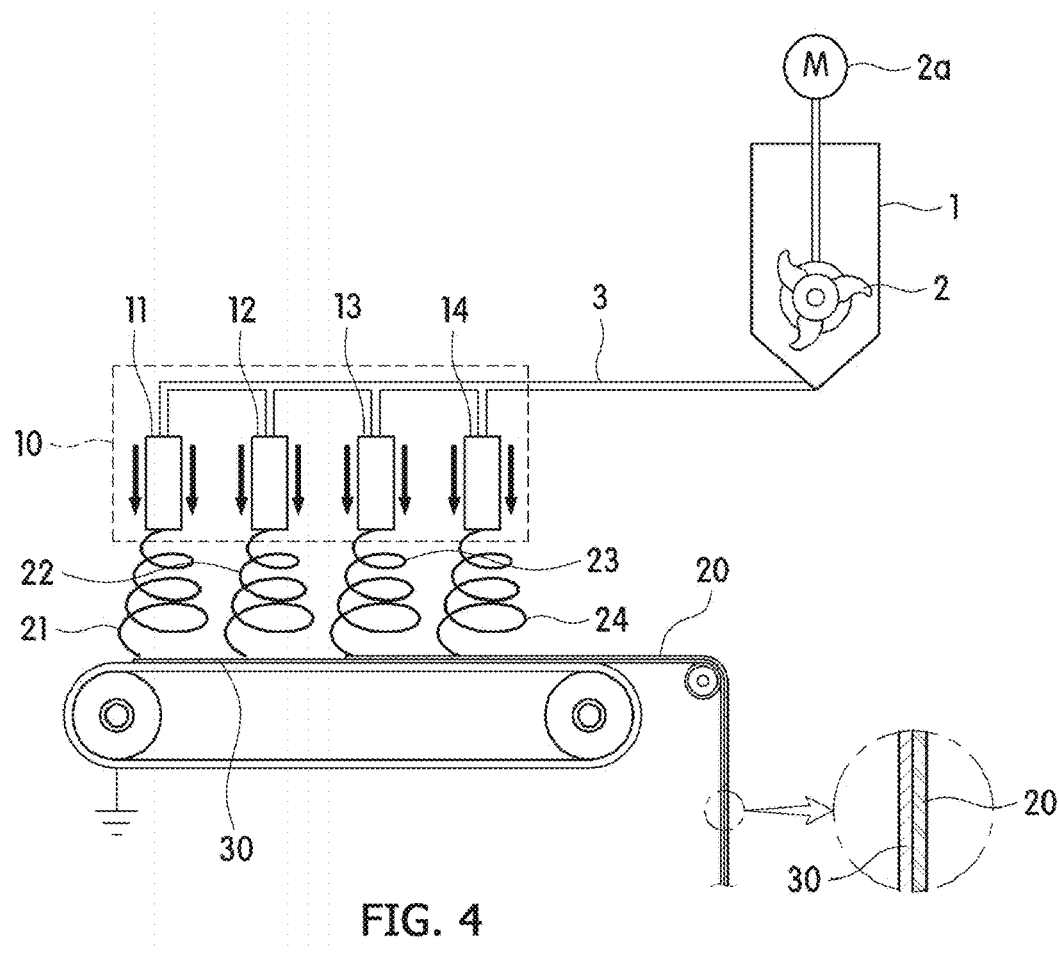
FIG. 4 is a mimic diagram illustrating an electric spinning apparatus that may manufacture the filter medium according to one embodiment of the present invention through inline processes.

Here, in the case in which the filter medium 120 is manufactured through the inline processes, as illustrated in FIG. 4, the filter medium 120 may be manufactured by a spinning solution being electrically spun by an electric spinning apparatus including a solution tank 1 in which the spinning solution is stored and spinning packs in which a plurality of spinning nozzles 11 to 14 connected to a high voltage generator (not shown) are disposed in a plurality of rows and columns.

Meanwhile, as illustrated in FIG. 5, the portable water-purifying pouch according to one embodiment of the present invention may further include a porous carbon filler 161 for deodorizing drinking water filtered by the filter medium 120 and adsorbing foreign material and a carbon-based filter 160 having an encapsulating material 162 which encapsulates the porous carbon filler 161.

The carbon-based filter 160 may solve a problem in that drinking water generated by target water being filtered through the above-described filter medium 120 for a first time may contain foreign materials which are not filtered by the filter medium 120 or may smell unfavorable for drinking as drinking water.

The carbon-based filter 160 may be provided inside the body of the portable water-purifying pouch, inside the outlet provided at the body, or outside the body by being connected to the outlet via a connecting member.

Figure 5A:
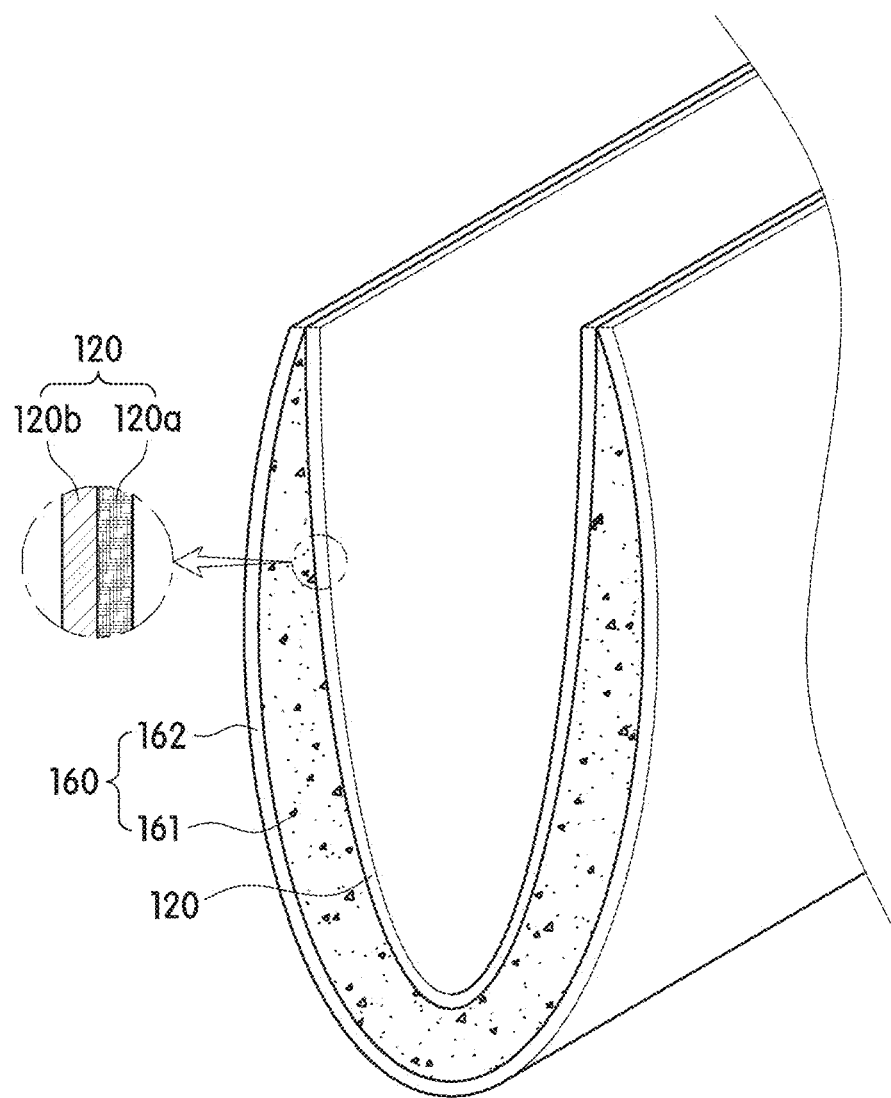
FIGS. 5A to 5C are views illustrating a carbon-based filter according to one embodiment of the present invention.

First, in the case in which the carbon-based filter 160 is provided in the body of the portable water-purifying pouch, as illustrated in FIG. 5A, the carbon-based filter 160 may be encapsulated with the encapsulating material 162 in a state in which the carbon-based filler 161 is accommodated in a predetermined space of the carbon-based filter 160 such that the outer surface of the filter medium 120 is in direct contact with the carbon-based filler 161. Alternatively, as illustrated in FIG. 5B, a carbon-based filter 160' is provided in a state in which an outer surface C of the carbon-based filter 160' in contact with the body 110 is adhered to a lower end portion of the filter medium 120 so that first filtered water A1 generated by water A0 being filtered by the filter medium 120 may be purified by the carbon-based filter 160' and become drinking water A2.

Figure 5C:
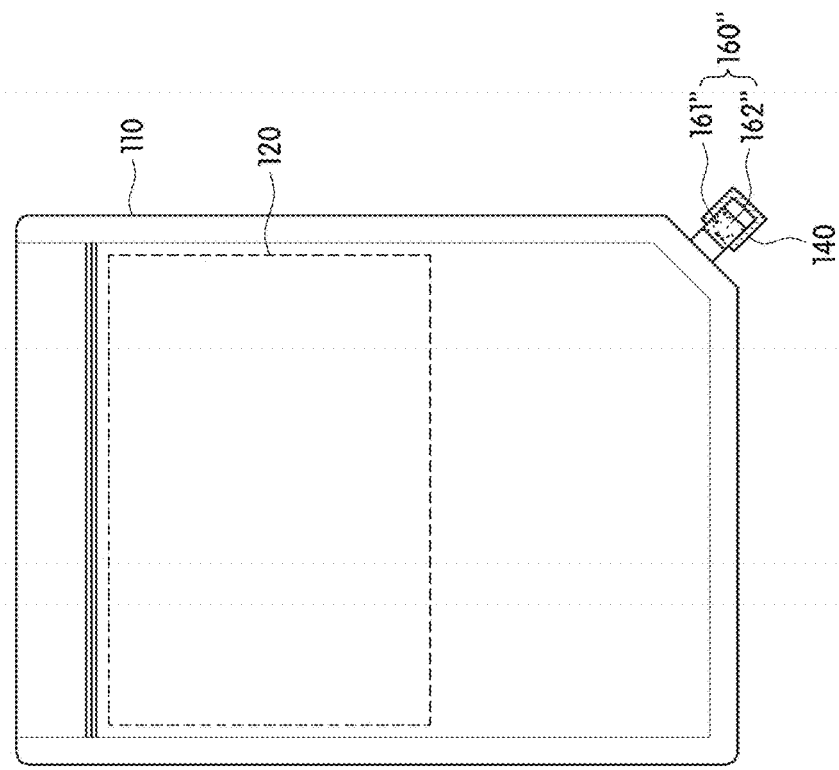
Figure 5B:
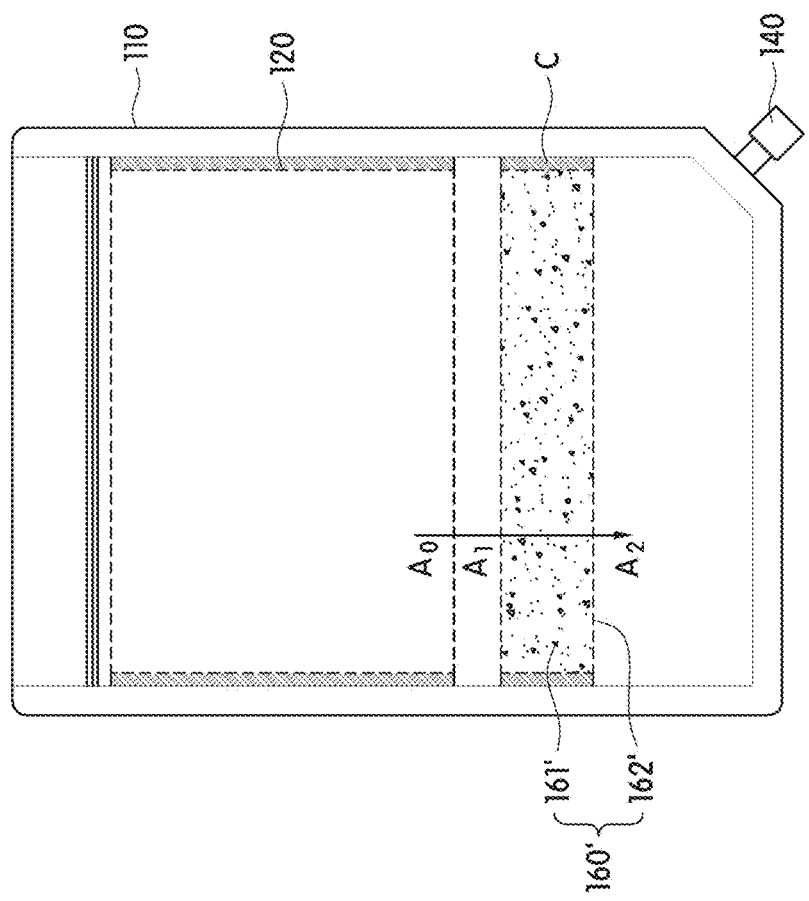

In addition, as illustrated in FIG. 5C, a carbon-based filter 160" may be provided in the outlet 140 provided in the body, and through this, a person may drink first filtered water as soon as the first filtered water filtered by the filter medium 120 is filtered by the carbon-based filter 160".

Carbon-based fillers 161, 161', 161", and 1610 included in carbon-based filters 160, 160', 160", and 1600 may include any kind of general porous carbon filler and may preferably include activated carbon having superior deodorizing and filtering performance. In addition, since encapsulating materials 162, 162', 162", and 1620 which respectively accommodate the carbon-based fillers 161, 161', 161", and 1610 may include any porous member having a pore diameter to prevent leakage of the carbon-based filler and not to hinder introduction of first filtered water filtered by the filter medium and penetration of the water filtered into the carbon-based filler, the encapsulating materials 162, 162', 162", and 1620 are not particularly limited in present invention.

Figure 6:
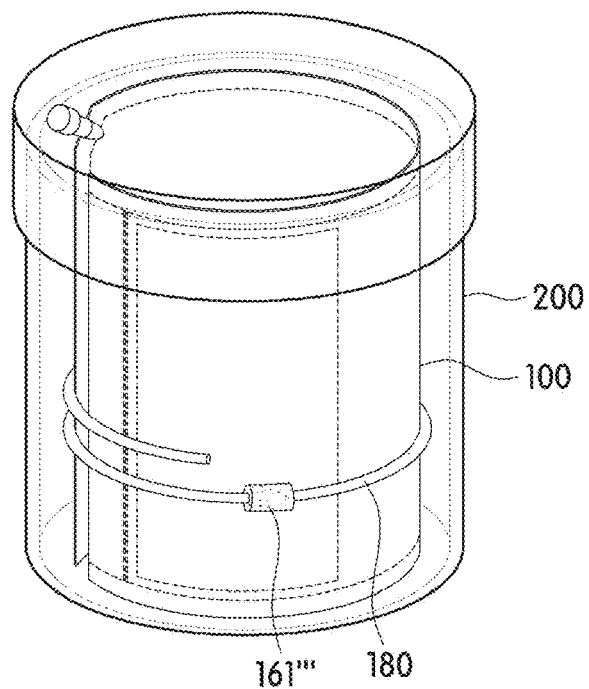
FIG. 6 is a perspective view illustrating a water-purifying package according to one embodiment of the present invention.

Meanwhile, as illustrated in FIG. 6, a portable water-purifying package according to one embodiment of the present invention may have a structure in which the portable water-purifying pouch 100 and a drinking pipe 180 are accommodated in a beverage storage container 200 including a container and a cap. Accordingly, drinking water purified by the portable water-purifying pouch 100 may be accommodated in the beverage storage container 200 and a person may drink the drinking water, or the drinking pipe 180 may be directly connected to the portable water-purifying pouch 100 and a person may drink the drinking water.

The drinking pipe 180 may have a predetermined length that a liquid pass through. One end of the drinking pipe 180 is connected to the outlet 140 and reacts to suction of a drinker such that the drinker may drink a liquid through the outlet 140. The drinking pipe 180 may be manufactured of a flexible material. In the case in which the drinking pipe 180 is manufactured of the flexible material, portability of the drinking pipe 180 is improved. Accordingly, in a case in which the drinking pipe 180 is connected to the outlet 140 and carried, the drinking pipe 180 may be withdrawn and liquid may be drunk without the portable water-purifying pouch being withdrawn from an additional storage space such as a bag.

Figure 7:
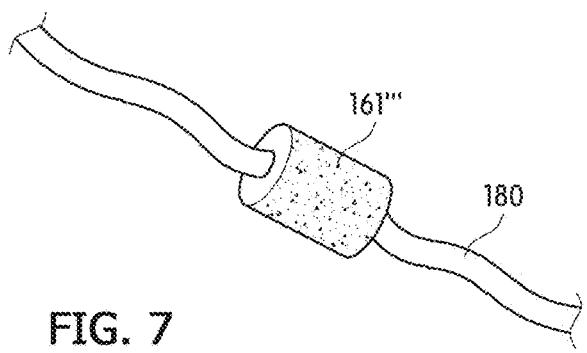
FIG. 7 is a perspective view illustrating a drinking pipe according to one embodiment of the present invention.

The portable water-purifying package may further include a carbon-based filter. As illustrated on FIG. 7, the carbon-based filter may be interposed between the one end of the drinking pipe 180 and the other end thereof. Here, liquid introduced through the outlet of the portable water-purifying pouch 100 is filtered by the carbon-based filter 161" for a second time. Accordingly, a drinker drinks the more purified liquid.

Figure 8:
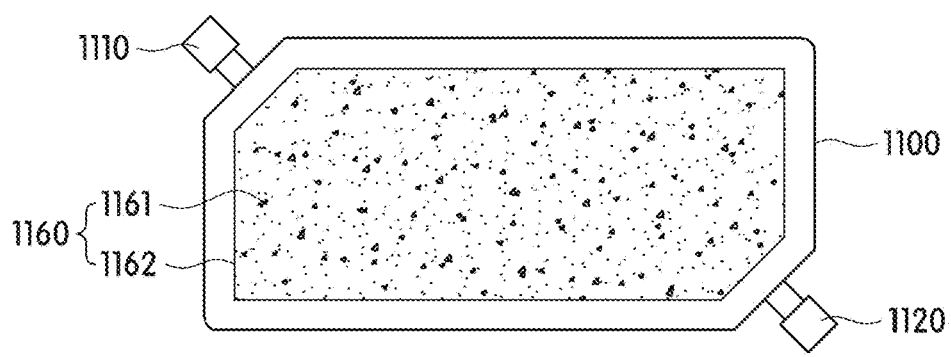
FIG. 8 is a cross-sectional view illustrating the carbon-based filter according to one embodiment of the present invention.

Alternatively, as illustrated in FIG. 8, the carbon-based filter according to one embodiment of the present invention may include a coupling member to be coupled to the outlet 140 of the body 110 of the portable water-purifying pouch 100 and a storage body 1000 having a first filtered water inlet 1110 through which first filtered water filtered by the filter medium 120 and an outlet 1200 through which second filtered water filtered by the carbon-based filter 1600 is discharged, and the carbon-based filter 1600 may be provided in the storage body 1000. Here, since the outlet 1200 may be coupled to the drinking pipe 180, a drinker may directly drink liquid filtered by the carbon-based filter 1600 for a second time.

Figure 10:
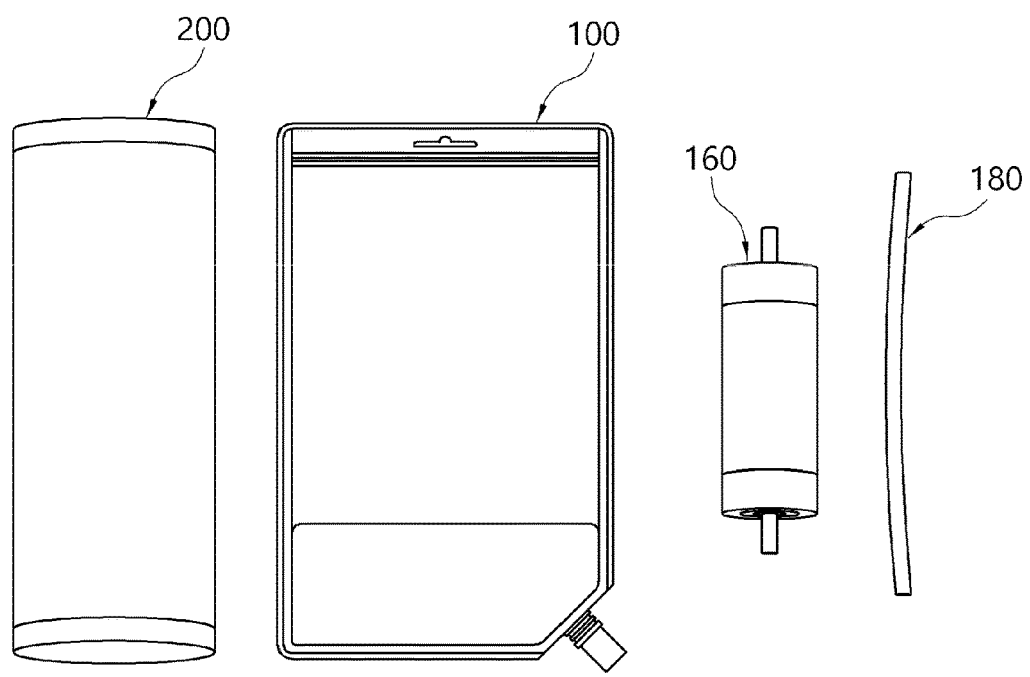
FIG. 10 is an image of the portable water-purifying pouch according to one embodiment of the present invention.

In addition, as illustrated in FIG. 10, the portable water-purifying pouch according to one embodiment of the present invention may include the storage container 200, the water-purifying pouch 100 configured to be accommodated in the storage container 200, the carbon-based filter 160, and the drinking pipe 180 as shown in FIG. 10 in order from a leftmost part thereof. Here, one end of the carbon-based filter 160 is connected to the outlet 140 of the water-purifying pouch 100, and the other end thereof is connected to one end of the drinking pipe 180, and thus liquid discharged from the outlet 140 may be filtered by the carbon-based filter 160 for a second time. Here, the carbon-based filter 160 and the outlet 140 may be forcibly insertion-coupled, but are not limited thereto, and they may be coupled through various methods under a condition in which filtered liquid does not leak.

EXAMPLES

Hereinafter, examples of the present invention will be described to facilitate understating of the present invention. However, the following examples are only for facilitating the understanding of the present invention, and the present invention is not limited to the following experimental examples.

Example 1

First, a mixed solution was manufactured by mixing polyacrylonitrile (N-PAN, Dolan Co., Mw: 85,000) at 10 parts by weight with respect to 100 parts by weight of polyvinylidene fluoride (Arkema, Kynar 761) to form a fiber-forming material, and dissoluting 12 g of the fiber-forming material in 88 g of dimethylacetamide at 80° C. for six hours with a magnetic bar to manufacture a spinning solution. Next, the mixed solution was cooled to room temperature, and a nonionic emulsifier (Daejung Chemical & Metals, Tween 80, HLB: 15) was included at 3 parts by weight with respect to 100 parts by weight of the fiber-forming material to manufacture the spinning solution. The spinning solution was input to a solution tank of an electric spinning apparatus and was discharged at a speed of 15 µl/min/hole. Here, a temperature of a spinning region was maintained at 28° C., humidity thereof was maintained at 40%, a distance between a collector and a spinning nozzle tip was 18 centimeters, a low-melting point conjugated fiber having polypropylene having a melting point of 125° C. was used as an initial portion and polyethylene having a melting point of 155° C. used as a core portion was formed on the collector as a support layer, a nonwoven structure (NamYang Nonwoven Fabric Co., CCP40) having a thickness of 190 µm and a basis weight of 40 g/m$^2$ was disposed, a voltage of 40 kV generated by a high voltage generator was applied to each spin nozzle pack, and at the same time, an air pressure of 0.03 MPa was applied to the spin nozzle packs to manufacture a fiber web formed on one surface of the nonwoven structure, which is formed of a PAN/PVDF nanofiber, and having a fitness of 0.4 µm, a porosity of 87%, a pore diameter of 0.4 µm, a basis weight of 6 g/m$^2$, and a thickness of 10 µm. Next, a fiber web was heat-treated at a temperature of 160° C. to dry a solvent and moisture remaining in the fiber web, and a calendaring process was performed by applying a pressure of 1 kgf/cm$^2$ to the nonwoven structure and a nanoweb at a temperature of 185° C. to manufacture a filter medium having a structure in which the nonwoven structure and the nanoweb were laminated.

Example 2 to 5

Filter mediums were manufactured through the same method as Example 1 and manufactured using a nanoweb and a nonwoven structure each having a basis weight, a thickness, a density, and the like shown in table 1.

Comparative Examples 1 to 2

Filter mediums were manufactured through the same method as Example 1 and manufactured using a nanoweb and a nonwoven structure each having a basis weight, a thickness, a density, and the like shown in table 1.

Experimental Example—Filter Efficiency

Filter efficiency was measured through a test in which fecal bacteria were removed (based on two million bacteria)

TABLE 1

|  |  | Example 1 | Example 2 | Example 3 | Example 4 | Comparative Example 1 | Comparative Example 2 |
|---|---|---|---|---|---|---|---|
| Basis Weight [g/m$^2$] | Nanoweb | 6 | 6.5 | 9 | 12 | 1 | 15 |
|  | Nonwoven | 40 | 40 | 40 | 40 | 40 | 40 |
|  | Filter Medium (Nanoweb/Nonwoven Lamination) | 48.5 | 46 | 48 | 51 | 46 | 76 |
| Thickness [µm] | Nanoweb | 10 | 9 | 7.5 | 16 | 3 | 30 |
|  | Nonwoven | 190 | 185 | 185 | 185 | 190 | 185 |
|  | Fused Part of Filter Medium (Nanoweb/Nonwoven Lamination State) | 6 | 6.4 | 4.4 | 6.1 | 1.8 | 22 |
| Pore | Nanoweb | 0.4 | 0.34 | 0.38 | 0.42 | 0.41 | 0.6 |

TABLE 1-continued

|  |  | Example 1 | Example 2 | Example 3 | Example 4 | Comparative Example 1 | Comparative Example 2 |
|---|---|---|---|---|---|---|---|
| Diameter [μm] | Filter Medium (Nanoweb/Nonwoven Lamination) | 0.38 | 0.34 | 0.41 | 0.48 | 0.22 | 0.56 |
| Fitness [μm] | Nanoweb | 0.4 | 0.4 | 0.3 | 0.4 | 0.3 | 0.7 |
| Filter Efficiency [%] | Filter Medium (Nanoweb/Nonwoven Lamination) | 99.99 | 99.12 | 81 | 85 | 30 | 80 |
| Water Permeability [%] |  | 100 | 100 | 82 | 81 | 70 | 30 |

It can be seen that the water filters of Examples 1 to 4 have superior filter efficiency and water permeability.

While the embodiments of the present invention have been described above, the spirit of the present invention is not limited to the embodiments described in the specification, and modified embodiments may be easily disclosed by adding, modifying, removing, and supplementing components within the same spirit by those skilled in the art, and will be fall within the scope of the present invention.

The invention claimed is:

1. A portable water-purifying pouch comprising:
a body having a pouch shape and including an inlet through which target water is introduced and an outlet through which drinking water generated by the target water being filtered is discharged; and
a filter medium having a pouch shape, provided in the body to accommodate and filter the target water introduced into the body, and including a fiber web layer having a three-dimensional network structure formed of nanofibers,
wherein each nanofiber includes a fiber-forming material comprising polyacrylonitrile (PAN) and polyvinylidene fluoride (PVDF), and a nonionic emulsifier which improves miscibility and spinnability of the fiber-forming material and has a hydrophile-lipophile (HLB) of 10 to 18,
wherein the nanofiber includes the nonionic emulsifier at 0.5 to 8 parts by weight based on 100 parts by weight of the fiber-forming ingredients, and
wherein the PAN and PVDF are uniformly distributed in each nanofiber.

2. The portable water-purifying pouch of claim 1, wherein an outer surface of at least one open end portion among outer surfaces of the pouch-shaped filter medium is fixed to an inner surface of the body.

3. The portable water-purifying pouch of claim 1, wherein the pouch-shaped filter medium further includes a support layer,
wherein the support layer is disposed on one or both surfaces of the fiber web layer or wherein the fiber web layer is disposed on each of both surfaces of the fiber web layer, and at least a part of the support layer is melted and thermally fused to the fiber web layer.

4. The portable water-purifying pouch of claim 3, wherein the support layer includes at least one among a nonwoven structure, a knit structure, and a fabric, wherein at least one among the nonwoven structure, the knit structure, and the fabric includes a polyolefin-based low-melting point conjugated fiber or a polyester-based low-melting point conjugated fiber.

5. The portable water-purifying pouch of claim 1, a cross-sectional thickness of the filter medium ranges from 10 to 300.

6. The portable water-purifying pouch of claim 1, wherein the fiber web layer has a thickness of 5 to 20 μm, a basis weight of 1 to 10 g/m$^2$, a porosity of 70 to 90% and an average pore diameter of 0.2 to 0.5 μm.

7. The portable water-purifying pouch of claim 1, wherein a diameter of the nanofiber ranges from 0.3 to 0.7 μm.

8. The portable water-purifying pouch of claim 1, further comprising a carbon-based filter including:
a porous carbon filler which deodorizes drinking water filtered by the filter medium and adsorb a foreign material; and
an encapsulating material which encapsulates the porous carbon filler.

9. The portable water-purifying pouch of claim 8, further comprising:
an internal carbon-based filter provided in at least one location inside the body and the outlet; or
an external carbon-based filter connected to the outlet through a connecting member and provided outside the body.

10. The portable water-purifying pouch of claim 9, wherein the carbon-based filter provided outside the body further includes an outlet through which refiltered drinking water is discharged.

11. The portable water-purifying pouch of claim 1, further comprising a drinking pipe connected to one side of the outlet such that drinking water filtered by the filter medium is drunk.

12. The portable water-purifying pouch of claim 11, further comprising a carbon-based filter par including:
a porous carbon filler which is interposed between one end and the other end of the drinking pipe and deodorizes drinking water suctioned through the drinking pipe and adsorb a foreign material; and
an encapsulating material which encapsulates the porous carbon filler.

13. The portable water-purifying pouch of claim 1, wherein the inlet is formed by at least a part of one side of the body being opened.

14. A portable water-purifying pouch comprising:
a body having a pouch shape and including a first region having at least an open part of one side such that target water is introduced therethrough and configured to accommodate the target water, and a second region in which drinking water generated by the target water being filtered is accommodated and which has an outlet through which the drinking water generated by the target water being filtered is discharged; and a filter medium having a pouch shape, configured to divide the first region and the second region provided in the body, and including a fiber web layer having a three-dimensional network structure formed of nanofibers, wherein each nanofiber includes a fiber-forming material comprising polyacrylonitrile (PAN) and polyvinylidene fluoride (PVDF), and a nonionic emulsifier which improves miscibility and spinnability of the fiber-forming material and has a hydrophile-lipophile (HLB) of 10 to 18, wherein the nanofiber includes the nonionic emulsifier at 0.5 to 8 parts by weight based on 100 parts by weight of the fiber-forming ingredients, and wherein the PAN and PVDF are uniformly distributed in each nanofiber.

15. A portable water-purifying package comprising:

the portable water-purifying pouch of claim 1;

a drinking pipe; and a beverage storage container including a container in which the portable water-purifying pouch and the drinking pipe are provided and a cap.

16. The portable water-purifying package of claim 15, wherein the drinking pipe further includes a carbon-based filter between one end and the other end of the drinking pipe.

17. The portable water-purifying package of claim 15, further comprising a carbon-based filter including one end coupled to the portable water-purifying pouch and the other end coupled to the drinking pipe.

* * * * *